Oct. 6, 1964    M. BAINBRIDGE ETAL    3,151,644
PINEAPPLE CORER AND SIZER
Filed April 24, 1962    3 Sheets-Sheet 1

MARVIN BAINBRIDGE
MASATO TSUTSUMI
    INVENTORS

BY Lyon & Lyon
    ATTORNEYS

Oct. 6, 1964
M. BAINBRIDGE ET AL
3,151,644
PINEAPPLE CORER AND SIZER
Filed April 24, 1962
3 Sheets-Sheet 2
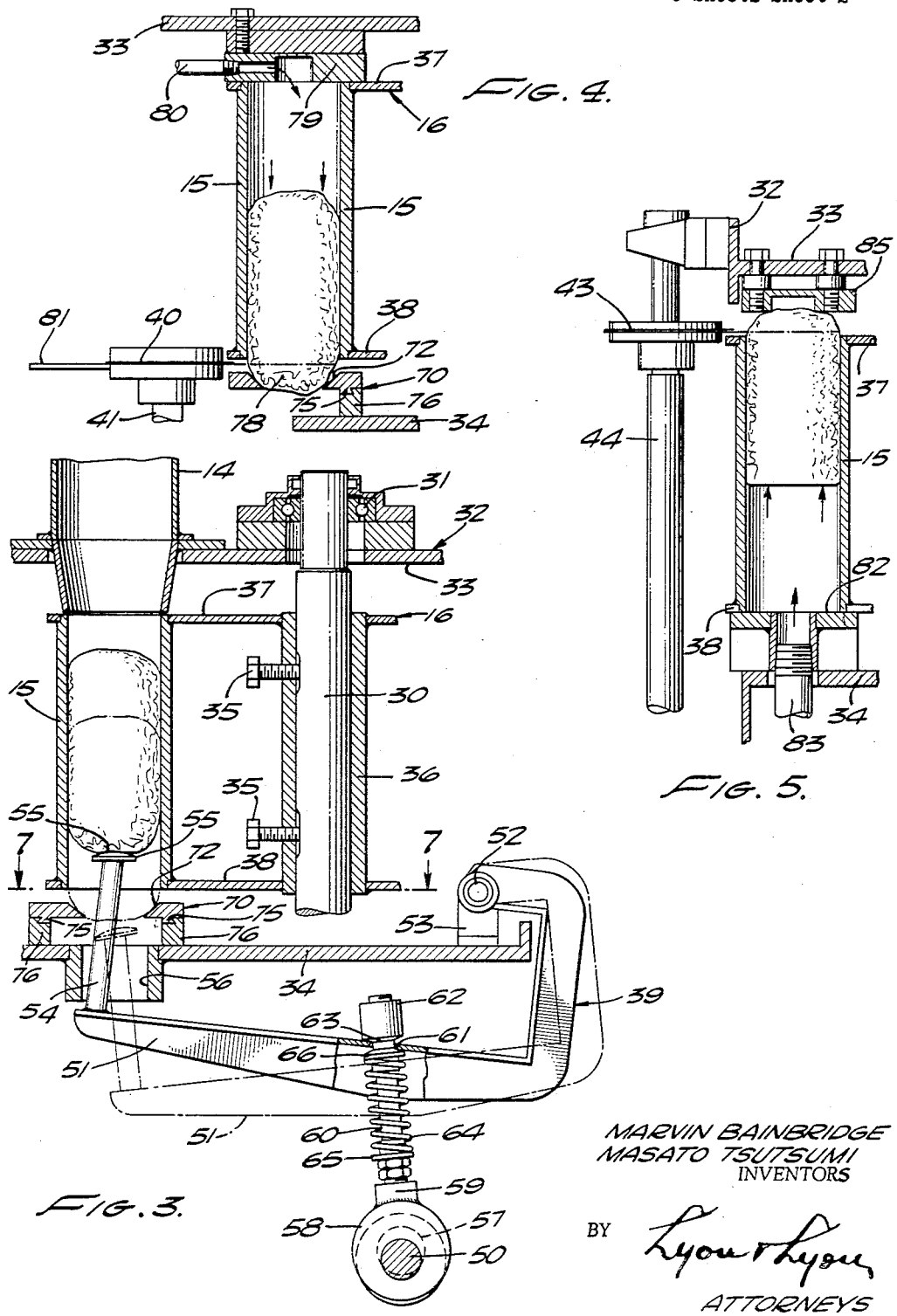
MARVIN BAINBRIDGE
MASATO TSUTSUMI
INVENTORS
BY
*Lyon & Lyon*
ATTORNEYS Oct. 6, 1964  M. BAINBRIDGE ETAL  3,151,644
PINEAPPLE CORER AND SIZER
Filed April 24, 1962  3 Sheets-Sheet 3
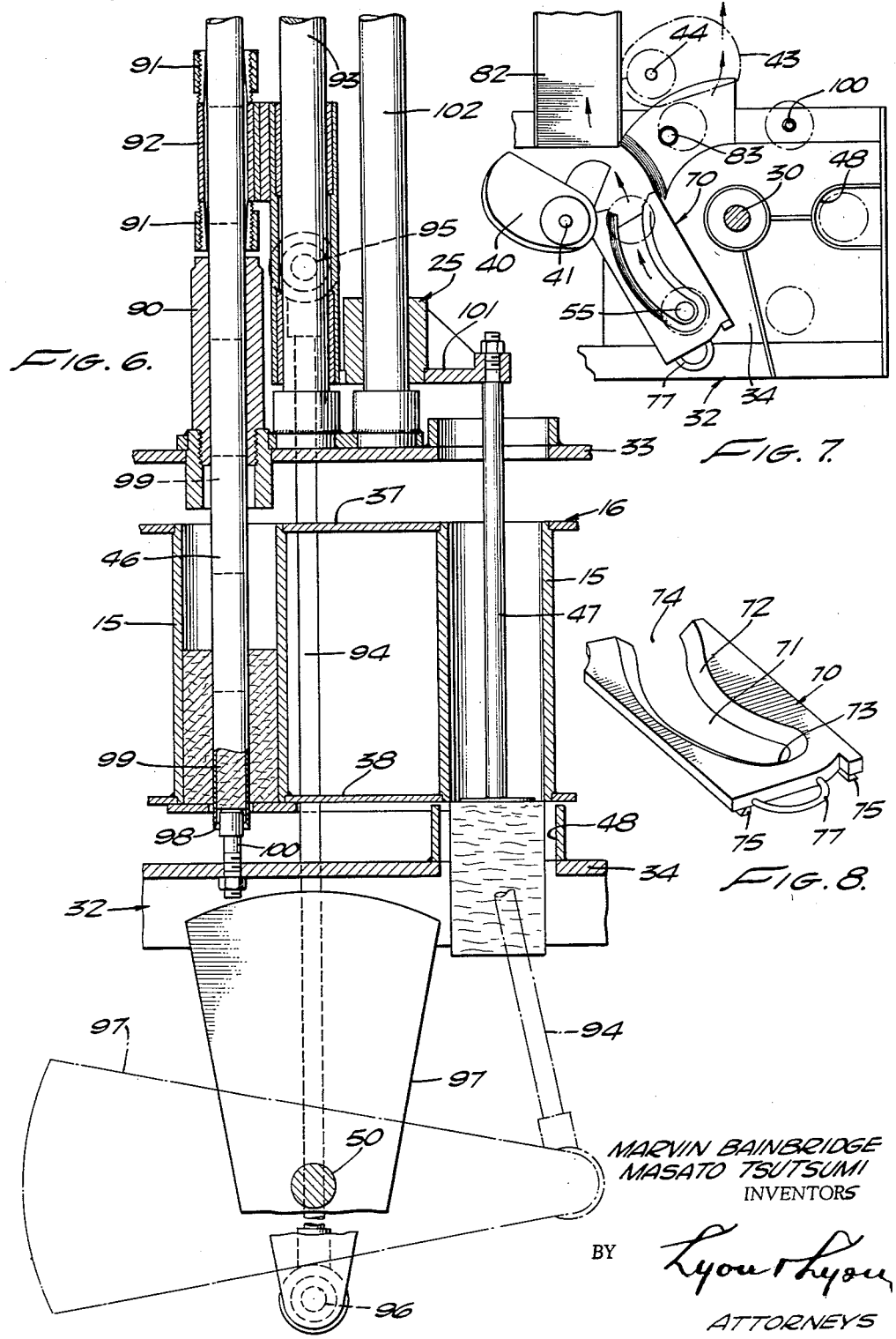
MARVIN BAINBRIDGE
MASATO TSUTSUMI
INVENTORS
BY Lyon & Lyon
ATTORNEYS 3,151,644
PINEAPPLE CORER AND SIZER
Marvin Bainbridge and Masato Tsutsumi, Kahului, Maui,
Hawaii, assignors to Maui Pineapple Company, Ltd.,
Kahului, Maui, Hawaii, a corporation of Hawaii
Filed Apr. 24, 1962, Ser. No. 189,823
1 Claim. (Cl. 146—6)

This invention relates to fruit processing machinery and is particularly directed to improvements in a pineapple corer and sizer, sometimes known as a "Ginaca" machine.

The principal object of this machine is to provide a device of this type having improved means for handling and processing the fruit after it has passed through the lister head to the rotary hollow sizing knife. A more particular object is to provide improved apparatus to minimize or eliminate bruising of the fruit after it passes through the throat below the sizing knife and comes to rest within one of a series of upright tubes or pockets provided on a turret. Another object is to provide a novel device which is stationary with respect to the turret and which automatically holds the fruit at an optimum position with respect to a rotary knife which removes the top end of the fruit.

Briefly stated, these and other and more detailed objects and advantages are achieved through the employment of a novel form of damper mechanism located below the turret and timed in its action to meet the falling fruit in one of the turret tubes and to cushion its fall to prevent bruising. Also, a novel form of profiled gaging plate is employed which forms the final stop limiting downward movement of the fruit, and which plate is shaped to allow a minimum loss of fruit at the end cut and which minimizes the amount of manual trimming necessary on each fruit.

Figure 2:
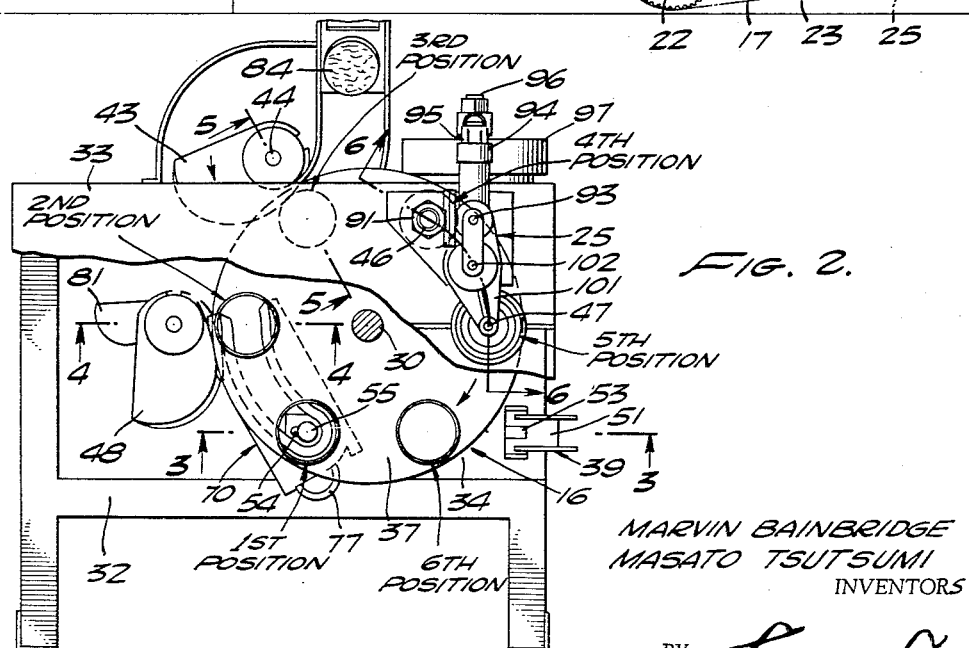
FIGURE 2 is a top plan view partly broken away and partly in section.

FIGURES 3, 4, 5 and 6 are sectional elevations on an enlarged scale taken substantially on the lines 3—3, 4—4, 5—5 and 6—6, respectively, as shown in FIGURE 2.

FIGURE 7 is a sectional plan view, partly broken away, and taken substantially on the lines 7—7 as shown in FIGURE 3.

FIGURE 8 is a perspective view of the profiled gaging plate.

Figure 1:
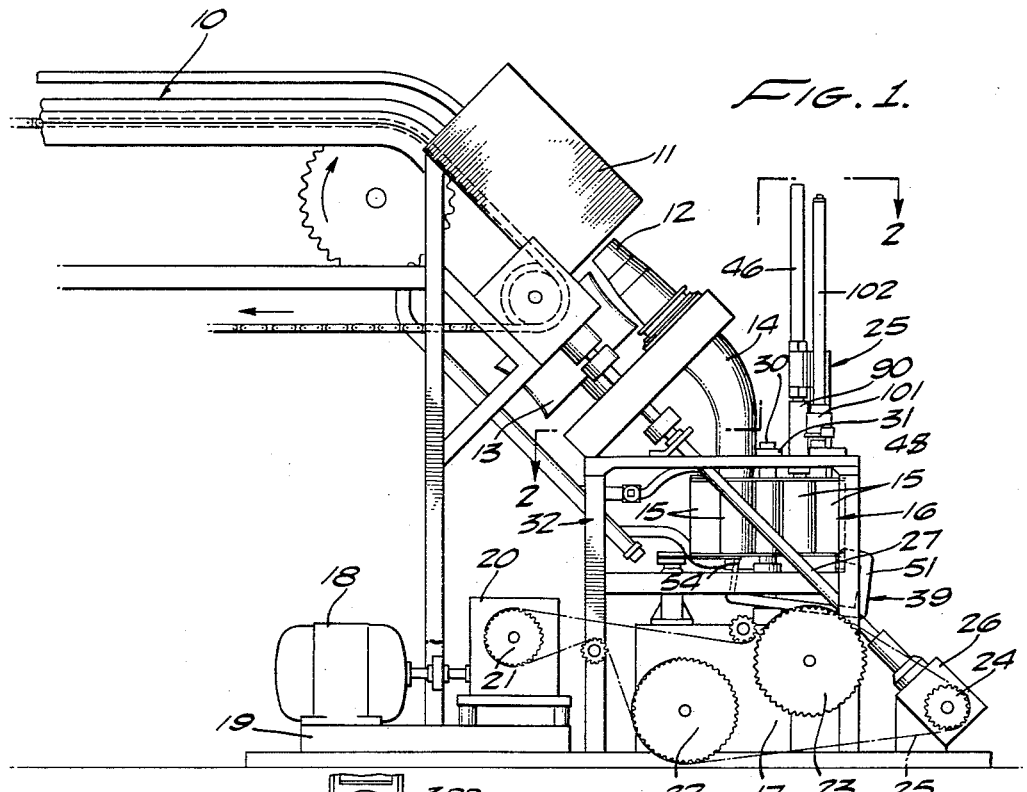
FIGURE 1 is a side elevation of a pineapple coring and sizing machine incorporating a preferred embodiment of this invention.

Referring to the drawings: The pineapple coring and sizing machine shown in FIGURE 1 receives each fruit as it is carried along the feed conveyor 10. The fruit has been previously graded and the stems, leaves and defects have been cut from the butt end of the fruit. The fruit passes through the conventional lister head 11 crown or top end first, and then into a hollow revolving sizing knife 12 which removes the skin and cuts a cylinder from the fruit. The removed skin is ejected by a revolving cleated drum 13. Sized fruit cylinders pass from the hollow sizing knife 12 downward through the curved throat 14 and into one of a series of vertical tubes 15, forming part of the turret generally designated 16.

The turret 16 may be inclined or vertical. It turns with an intermittent motion and is driven by a cam and follower mechanism known in the trade as a "Ferguson Mechanism" (not shown) and contained within the housing 17. The main drive motor 18 is mounted on the frame 19 and is connected to drive the reduction gear 20. The power take off sprocket 21 on the reduction gear 20 drives the sprockets 22, 23 and 24 by means of the chain 25. The sprocket 22 drives the Ferguson Mechanism within the housing 17 as well as the top knife and bottom knife referred to below. The sprocket 23 drives a crank shaft for raising and lowering the cross head 25 and for operating the damper mechanism, as described below. The sprocket 24 drives through right angle gearing 26 to turn the inclined shaft 27. Suitable transmission connections (not shown) are provided whereby the shaft 27 may drive the rotary sizing knife 12, the revolving drum 13 and the conveyor 10.

The shaft 30 driven intermittently by the Ferguson Mechanism (not shown) is mounted in bearing 31 carried on the frame 32. The turret 16 is fixed to the shaft 30 at a location between the parallel plates 33 and 34 mounted on the frame 32. Set screws 35 are provided on the hub 36 of the turret 16 for securing the turret to the shaft 30 for rotation as a unit. The upright tubes 15 are duplicates and are equally spaced around the turret 16 and extend between the top wall 37 and the bottom wall 38. In a particular form of the device shown in the drawings, six upright tubes 15 are provided on the turret 16.

Six stations or positions are provided on the frame 32 as best shown in FIGURES 2 and 7. The fruit is received in the first position and its downward motion is arrested by means of the damper mechanism 39, as shown in FIGURE 3. In the second position as shown in FIGURE 4, the "top end" of the fruit (the lower end of the fruit cylinder) is severed by means of the rotary knife 40 which is carried on the upper end of the shaft 41. In the third position as shown in FIGURE 5, the butt end of the fruit (the upper end of the fruit cylinder) is severed by means of the rotary knife 43 which is carried on the shaft 44. In the fourth position as shown in FIGURE 6, the core tube 46 is projected centrally through the fruit to remove the core therefrom and in the fifth position, also shown in FIGURE 6, a pusher rod 47 expels the fruit from the tube 15 and through the discharge opening 48 on the frame 32. The sixth position is empty and is used only for maintenance and conversion purposes.

The shaft 50 turns in timed relation with the motion of the turret 16, and this shaft drives the damper mechanism shown in FIGURE 3 as well as the vertically movable core tube 46 and the pusher rod 47 as shown in FIGURE 6. The damper mechanism 39 includes a lever 51 pivotally mounted on a horizontal pin 52 carried on a bracket 53. The bracket 53 is fixed on the horizontal plate 34 forming a part of the frame 32. The horizontal pivot pin is located at the same elevation as the lower face of the plate 38 of the turret 16. A post 54 is fixed to the swinging end of the lever 51 and this post carries an enlargement 55 at its upper end which contacts the central portion of the fruit later to be removed by the core tube 46. The post 54 projects upward through the opening 56 in the plate 34. An eccentric portion 57 on the shaft 50 is contacted by the encircling ring 58 provided with hub 59. The bar 60 has one end threadedly received in the hub 59 and the other end projects through an aperture 61 in the lever 51. An abutment 62 threaded on the upper end of the bar 60 is provided with a curved lower face 63 for engagement with the surface of the lever 51. A coil compression spring 64 engages the shoulder 65 at one end and engages the sliding collar 66 at the other end. The collar 66 slides on the bar 60 and is provided with a curved upper surface for contact with a lower face of the levers 51. From this description it will be understood that rotation of the shaft 50 serves to oscillate the lever 51 and post 54 about the pivot pin 52, downward motion being by positive action, and upward motion being cushioned by action of the coil spring 64.

The lever 51 and post 54 are in uppermost position when contacted by the fruit descending in the tube 15, at the first position. The impact of the falling fruit is cushioned by means of the spring 64 to prevent bruising. Moreover, the impact shock is absorbed at the core of the fruit. Since the fruit may be longer than the length of the turret tube 15, the fruit is lowered when the post 54 descends to a position in which the lower end of the fruit projects below the lower surface of the turret plate 38. The fruit is brought to rest on a profiled gaging plate 70. This gaging plate has a shape which will allow a minimum loss of fruit at the end cut. The gaging plate is provided with an arcuate groove or opening 71 defined by a continuous bevel edge 72. The opening 71 is closed at one end 73 and is open at the other end 74. The bevel and width of the opening 71 are of such dimension to allow a pointed fruit to descend further than a normal flat crowned fruit. Subsequent severing of this pointed end serves to equalize the amount of manual trimming necessary on each fruit. The gaging plate 70 is provided with parallel dovetail rails 75 on its lower surface, which rails 75 slide within trackways 76 mounted on the stationary plate 34. A handle 77 is provided on one end of the profiled gaging plate 70 to facilitate installation and removal of the gaging plate from its operative position on the stationary frame. The post 54 and its enlarged head 55 are of such size as to pass readily through the curved opening 71 in the gaging plate 70. The lower end of the fruit cylinder (the "top end" of the fruit) slides along the bevelled surface 72 as the turret 16 indexes from one position to the next. When the fruit reaches the end of the gaging plate 70 adjacent the open end 74 of the opening 71, the knife 40 rotates to sever the end 78 from the remainder of the fruit as shown in FIGURE 4. In this second position the fruit is held against the bevel edge 72 of the gaging plate 70 by air pressure applied in the upper end of the tube from the closure 79 and air pipe 80. A pusher 81 mounted on the knife 40 engages the severed end 78 and propels it into a discharge chute 82 as shown in FIGURE 7. It will be noted that the arcuate curved shape of the opening 71 in the gaging plate 70 does not continue to the open end 74, but on the contrary the curvature is reversed near the open end 74 in order to facilitate movement of the severed end 78 in a direction away from the turret 16 and into the discharge chute 82.

At the third position shown in FIGURE 5 the fruit is raised in the tube 15 by means of air pressure delivered through the closure plate 82 and air pipe 83. The butt end 84 of the fruit is then severed by the rotary knife 43 while the fruit is maintained in contact with the stationary gage part 85. This part is supported on frame 32. The severed butt end 84 passes into the discharge chute 88 as shown in FIGURE 2.

The next indexing movement of the turret 16 brings the fruit into position beneath the coring tube 46. The core tube 46 is mounted to slide within a stationary guide 90 mounted on the frame 32. The tube 46 is engaged by collet 91 mounted on a cross head 92 slidably mounted on a stationary vertical post 93. A connecting rod 94 is pivotally connected to the cross head 92 at 95 and the other end of the connecting rod 94 is pivotally connected at 96 to a crank arm 97 which also serves as a counterbalance. Rotation of the shaft 50 causes the connecting rod 94 to reciprocate the cross head 92 with respect to the stationary post 93, and this action causes the coring tube 46 to move vertically through an aligned tube 15 in the turret 16. The sharp lower end 98 of the core tube 46 cuts a round circular core 99 from the fruit and the stationary anvil 100 prevents damage to the fruit while the core is being cut therefrom. The severed cores 99 accumulate in the tube and are extruded through the upper end thereof into a gravity conveyor (not shown).

The discharge of the fruit at the fifth position is accomplished by the pusher rod 47. This rod is connected at its upper end to a slide bracket 101 attached to the cross head 92 and arranged to slide on the stationary vertical post 102.

Having fully described our invention, it is to be understood that we are not to be limited to the details herein set forth but that our invention is of the full scope of the appended claim.

We claim:

In a Ginaca machine having a turret adapted to turn intermittently about a vertical axis and having vertical tubes on the turret for successively receiving a fruit from a sizing knife, the combination of: a damper assembly for cushioning the descent of a fruit in a turret tube and for bringing it to rest with an end portion of the fruit projecting below the lower end of the turret tube, said damper assembly including a post adapted to move into and out of the lower end of the turret tube, the upper end of the post being adapted to be engaged by the central core of a fruit, a stationary gaging plate below the turret having a horizontal portion for contact with the lower projecting end portion of the fruit, the horizontal portion of the gaging plate having an elongated opening curved to conform to the path of travel of the turret tubes, the post swinging freely through said curved elongated opening, and means for moving the post in both directions, said means including resilient means for raising the post.

References Cited in the file of this patent

UNITED STATES PATENTS

| | | |
|---|---|---|
| 873,436 | Holdren | Dec. 10, 1907 |
| 1,001,931 | Cookson | Aug. 29, 1911 |
| 1,112,130 | Ginaca | Sept. 29, 1914 |
| 2,910,102 | Windman et al. | Oct. 27, 1959 |